3,025,903
TOOL FOR FORMING CAN BODIES
Frank Wahl, North Bergen, N.J., assignor to Western Electric Company, Incorporated, New York, N.Y., a corporation of New York
Filed June 30, 1958, Ser. No. 745,372
2 Claims. (Cl. 153—2)

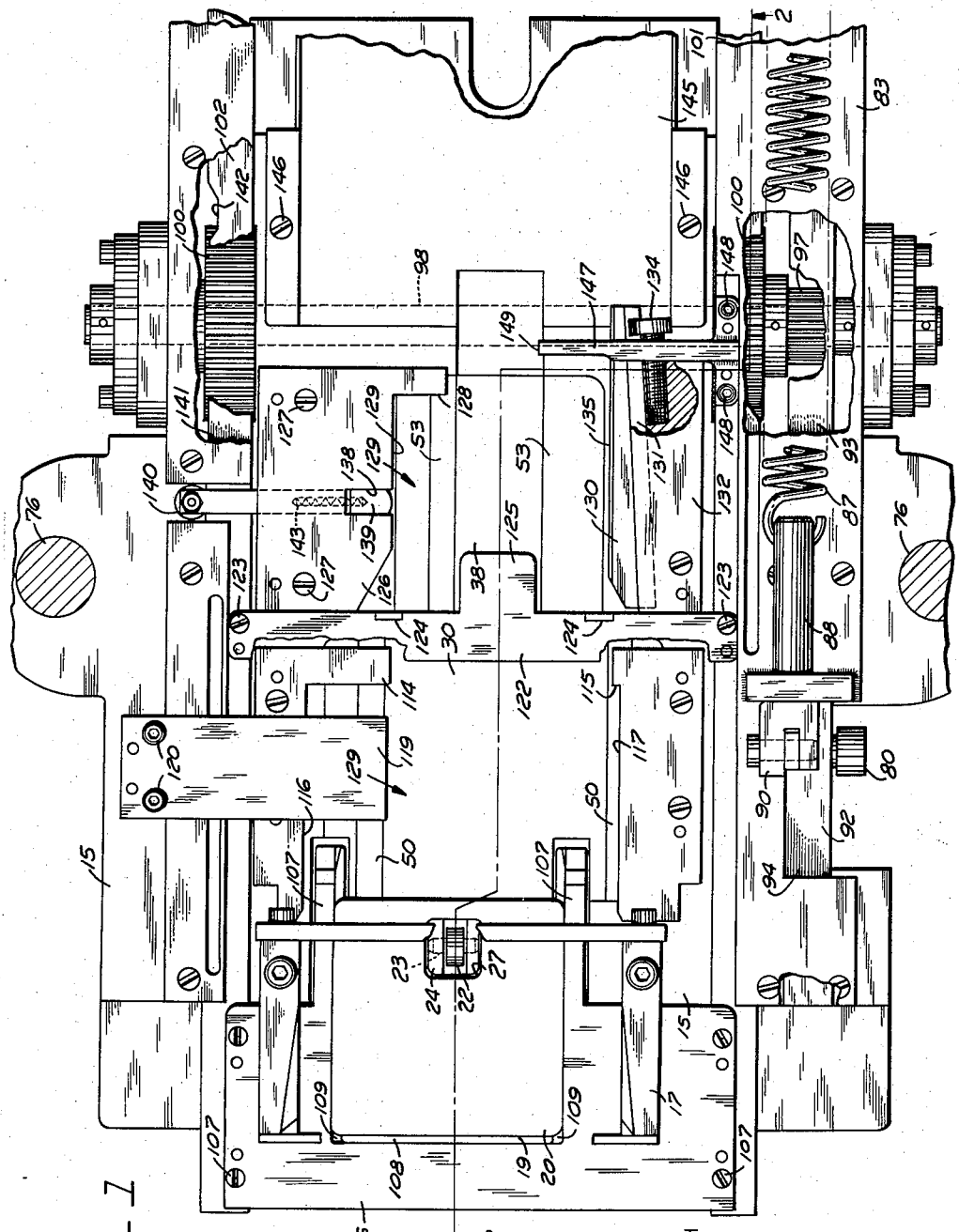

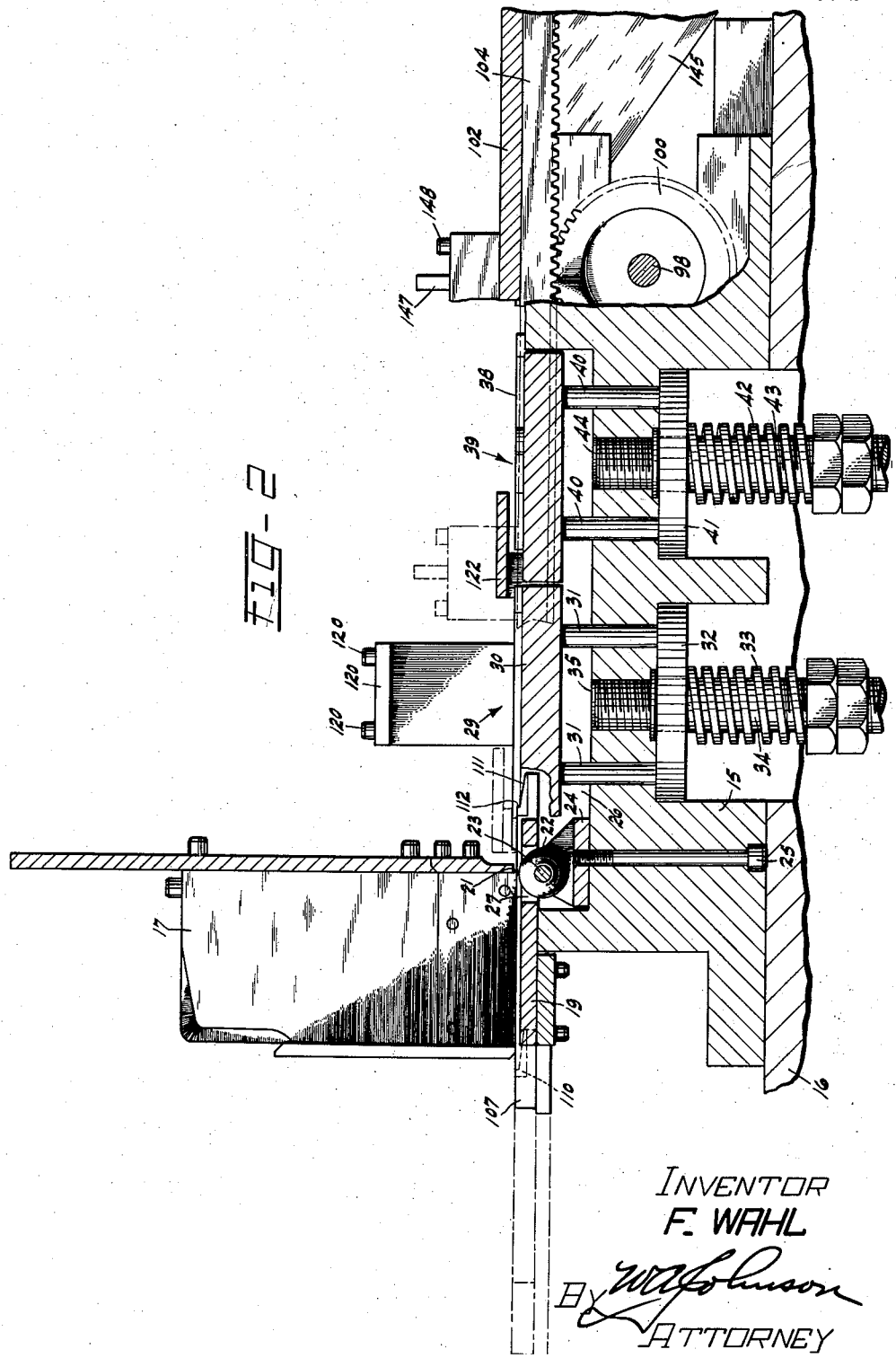

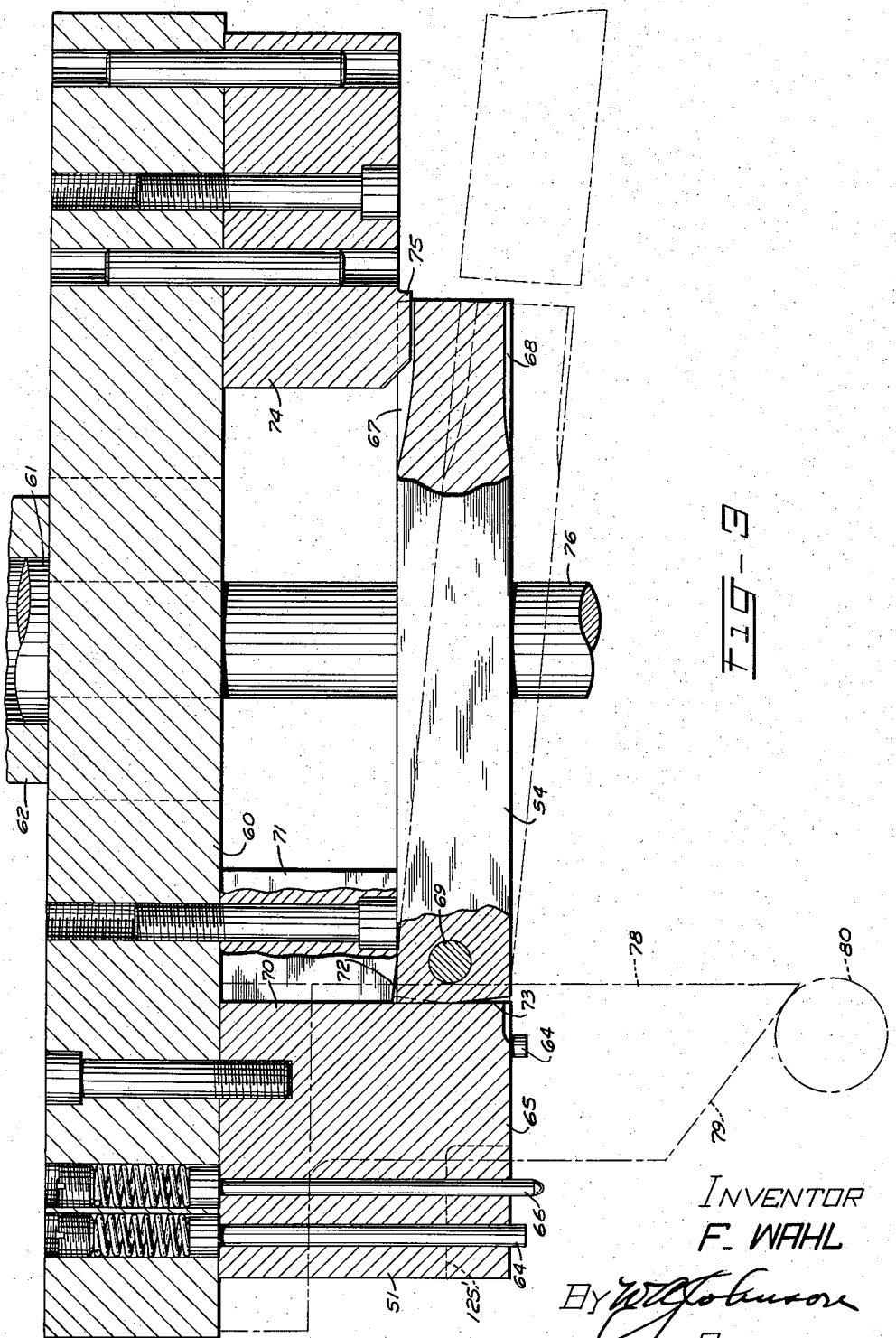

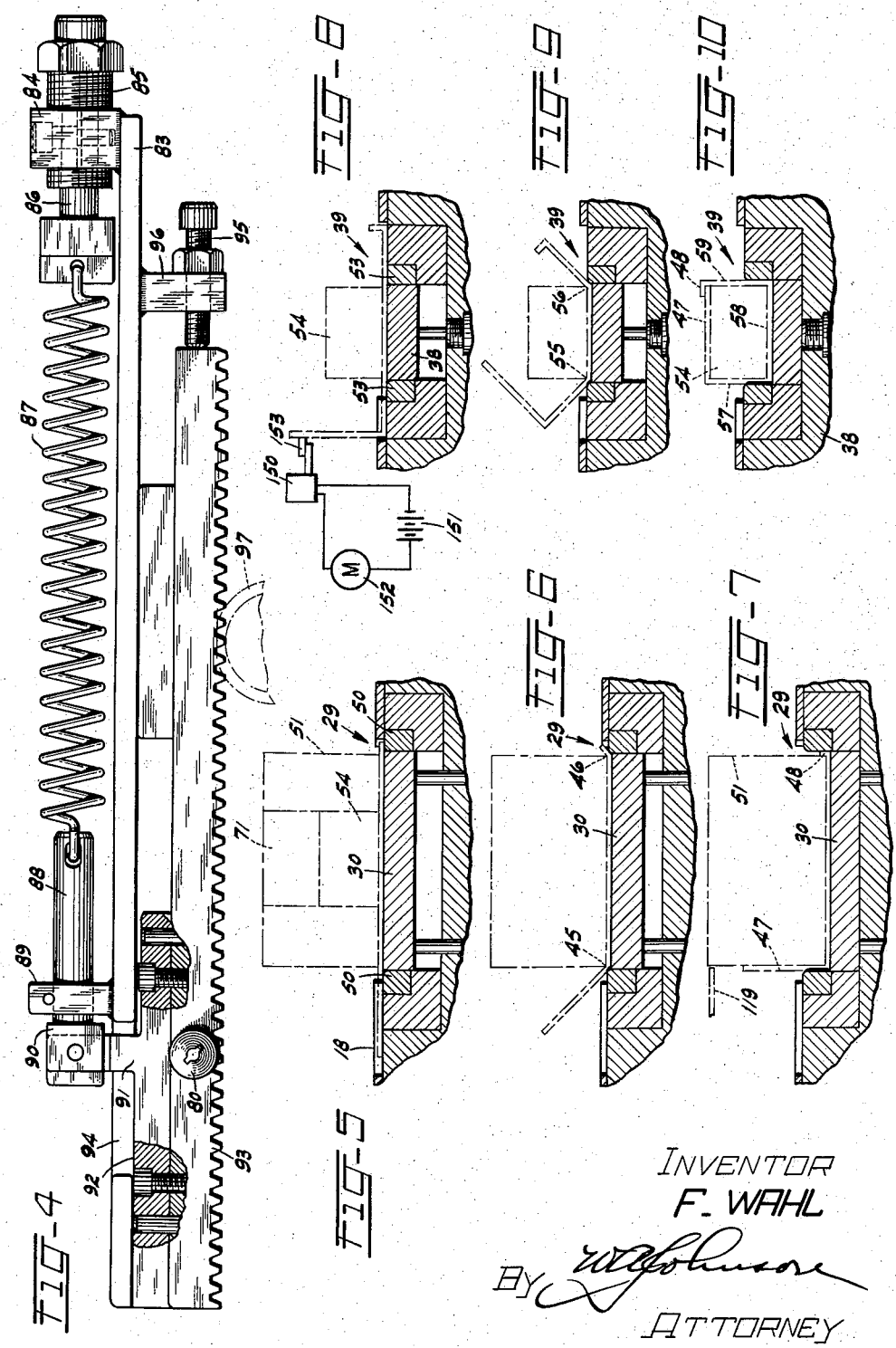

This invention relates to tools for presses particularly tools for forming shells from blanks.

Shells in the form of rectangular cans having open ends for use in housing electrical components heretofore have been partially formed by one tool in a press and subsequently finally formed by a second tool in another press requiring manual feeding of blanks to the initial tool and the partially formed parts to the second tool, in addition to the transporting of the parts from one tool to the other.

The object of the present invention is a tool which is automatic in operation and highly efficient in the forming of blanks into hollow articles.

In accordance with the object, the invention includes a tool, for use in a press having a ram reciprocable through operating cycles relative to a bed for forming a succession of multi-sided hollow articles from preformed blanks of material. The tool includes a first punch and die carried by the ram and bed respectively and cooperating to form a first bend in each blank during successive cycles, a second punch and die carried by the ram and bed respectively to form additional bends in the blanks, and means operated by the ram to advance the blanks with the first bends from the first die to the second die to complete a multi-sided article during each operating cycle.

In the present embodiment of the invention, a hopper supports a stack of blanks positioned in advance of the first die which is disposed in advance of the second die, the latter being disposed in advance of an inclined chute to direct the finished article from a tool. The first and second punches are mounted on a punch holder carried by the ram of the press, and positioned to cooperate with the dies. Also mounted on the punch holder is a cam positioned to operate a feeding mechanism to feed a blank from the hopper to the first die, to feed the article with the first bends from the first die to the second die and to eject the finished article from the second punch.

Other objects and advantages will be apparent from the following detailed description when considered in conjunction with the accompanying drawings, wherein:

FIG. 1 is a top plan view of the tool with the punch holder and punches removed;

FIG. 2 is a vertical sectional view taken along the line 2—2 of FIG. 1;

FIG. 3 is an enlarged vertical sectional view of the punches illustrating the cam and their mounting on the ram;

FIG. 4 is an enlarged side elevational view of a portion of the feeding mechanism;

FIGS. 5, 6 and 7 are fragmentary sectional views of the first die and punch illustrating progressive formations of the first bends, and FIGS. 8, 9 and 10 are fragmentary sectional views of the second die and punch illustrating progressive formation of the final bends.

Attention is directed first to FIG. 2 which illustrates a main frame 15 mounted on a bed 16 of a press. A hopper 17 is mounted on the main frame 15 to receive a stack of blanks 18 illustrated in FIGS. 5 to 10 inclusive. A table 19 supports the stack of blanks in the hopper 17 and has its upper surface 20 positioned beneath the outlet 21 of the hopper a distance substantially equaling the thickness of each blank. A roller 22 has its spindle 23 mounted in a bracket 24 and held in a fixed position by one or more screws 25 in a hollow portion 26 of the frame 15. The roller extends through an aperture 27 in the table 19 with its periphery positioned above the surface 20 to raise each blank above the surface of the table and to guide it onto the first die, indicated generally at 29. A pressure pad 30 for the first die 29 is disposed in the hollow portion 26 of the frame 15 and supported by spaced pins 31 which are fixed to and carried by a member 32. The pins 31 are slidable in apertures of the frame 15 and are urged upwardly into the position shown in FIG. 2 by a spring 33 which is disposed concentric with a rod 34 extending through the member 32. The upper end of the rod 34 is mounted in a threaded aperture 35 of the base 15. A similar pressure pad 38 for a second die 39 is supported by pins 40 which extend through apertures in the frame 15 and are fixed to a member 41 which is normally urged upwardly by a spring 42 mounted on a rod 43 which extends through the member 41 and has its upper end mounted in a threaded aperture 44 in the frame 15.

Attention is next directed to the first forming die indicated generally at 29 in FIGS. 5, 6 and 7. These views are taken laterally of the tool to illustrate the forming of the first bends 45 and 46 to produce one side 47 and lip 48 of the finished article. The die includes wear resisting members 50 cooperating with the first punch 51 as the material is first taken into the die from the position shown in FIG. 5 through the position shown in FIG. 6 to the position shown in FIG. 7 where the pressure pad 30 is fully compressed.

The second die indicated generally at 39 in FIGS. 8, 9 and 10 includes wear resisting members 53 cooperating with a second punch 54 to form additional bends 55 and 56 as the punch moves the partially formed article against the pressure pad 38 from the position shown in FIG. 8 to the fully compressed position shown in FIG. 10 to complete the article about the second punch 54 and form sides 57, 58 and 59.

The first and second punches 51 and 54 are shown in FIG. 3 mounted on a punch holder 60 having a shank 61 mounted in the conventional ram 62. The punch 51 in the present instance has spring pressed plungers 64 moving in advance of the blank engaging surface 65 to hold the blank in place on the pressure pad 30 prior to the forming operations illustrated in FIGS. 5, 6 and 7. In some instances, when apertures are pre-punched in the blanks, a locating spring pressed pin 66 carried by the first punch 51 enters the aperture of each blank prior to the blank being gripped by the plungers 64 and the pressure pad 30. The second punch 54 has a cross-sectional contour as illustrated in broken lines in FIGS. 8, 9 and 10 with the exception of its right end which has grooves 67 and 68 formed therein to facilitate in the removal of the finished article from the punch. The opposite end of the punch 54 is mounted on a pivot 69 which is carried by parallel portions of the die 5', these portions being disposed upon each side of a vertical groove 70 in which a block 71 is mounted. The block 71 has a tapered under surface 72 to permit the punch 54 to move downwardly from its forming position, shown in solid lines, to its ejecting position, shown in broken lines. The pivoted end of the punch has a tapered surface 73 cooperating with the adjacent surface of the first punch 51 to stop the second punch in the ejecting position. The free end of the second punch is supported in its forming position by a member 74 which is mounted on the punch holder 60 and has a lip 75 extending into the groove 67. The punch holder 60 is guided in its reciprocal cycle on parallel rods 76, which extend vertically from fixed positions in the frame 15.

The punching holder 60 has a cam 78 mounted thereon with a tapered surface 79 positioned to engage a roller 80 of a feeding means shown partially in FIG. 4 and completely in FIGS. 1 and 2. The partial disclosure of the feeding means shown in FIG. 4 includes a bracket 83 fixedly mounted on the frame 15 and carrying a stationary internally threaded member 84 for adjustably receiving a threaded sleeve 85 in which a member 86 is located. The member 86 has one end of a spring 87 connected thereto, the other end of the spring being connected to a rod 88 which is slidable in a collar 89 fixedly mounted on the bracket 83. The rod 88 has an enlarged bifurcated end 90 fixed to a vertical member 91 of a bracket 92 which is fixedly mounted on a rack 93, the vertical member extending through an opening 94 of the bracket 83. The rack has the limits of its longitudinal movement varied by an adjustable stop 95 disposed in a threaded aperture of a downwardly projecting portion 96 of the bracket 83. The rack interengages a pinion 97 and is adapted to rotate the pinion counter-clockwise when the cam 78, FIG. 3, moves downwardly to move the roller 80 to the left, whereas, during opening of the tool or upward movement of the cam 78, the roller 80 is freed to move to the right under the force of the spring 87 to rotate the pinion 97 clockwise.

Attention is now directed to FIG. 1 which illustrates the pinion 97 mounted upon a shaft 98. The shaft extends laterally through the lower portion of the tool and is journaled in suitable bearings, not shown, supported by the frame 15. Gears 100 are mounted upon the shaft beneath parallel sides 101 and 102 of a unit which is to be known as a transfer unit.

Racks 104 are mounted on the under surfaces of the sides 101 and 102 of the transfer unit, the teeth of the racks intergengaging their respective gears 100. Through this connection, counter-clockwise rotation of the shaft 98, FIG. 2, will move the unit to the left, whereas clockwise rotation of the shaft will move the unit to the right. The ratio of the pinion 97 to the like gears 100 is such that the short movement of the rack 93 to rotate the pinion will produce a far greater movement of the transfer unit through the action of the gears 100 and the racks 104.

A blank feeding member 106 of the transfer unit has its ends fixedly mounted at 107 to the sides 101 and 102 and provided with integral feeding fingers 107 upon each side of a cut-away portion 108 which has tapered side surfaces 109 slidably engaging similarly tapered side edges of the table 19. The tapered surfaces 109 extend to the right and are parts of the fingers 107 to assure accurate positioning of the fingers and to permit the top surface of each finger and the adjacent portion of the member 106 to lie in the same plane as the upper surface 20 of the table 19. The forward ends of the fingers 107 have inserts 110 of wear resisting material, the inserts having tapered upper surfaces 111 terminating adjacent shoulders 112 so that these portions of the fingers may move readily beneath the lowermost blank 18 in the hopper 17 and have its trailing edge engaged by the shoulder 12 of each finger to be pushed to the right, FIGS. 1 and 2, over the roller 22 and onto the first die 29. Stationary stops 114 and 115 are mounted on the frame 15 to engage the leading edge of each blank to located each blank on the first die 29. Parallel surfaces 116 and 117 guide the side edges of each blank into position on the first die 29. A stationary element 119 mounted at 120 on the frame 15 is positioned above the first die 29, free of the first punch 51 and has its free end located to engage the uppermost edge of the side 47 of the partially formed blank 18 to strip the blank from the first punch 51 during opening of the tool.

A second feeding member 122 of the transfer unit extending transversely of the lower portion of the tool has its ends fixedly mounted at 123 on the sides 101 and 102. The member 122 has inserts 124 of wear resisting material to engage the upwardly bent portions 47 and 48 from the first die 29 and move the article to the second die 39. A projecting lip 125 extends over the central portion of the partially formed article from the first die to assist in guiding the article to the second die. The first punch 51 is recessed at 125' at its center rear so as not to interfere with the lip 125 when the frame is at the left, FIG. 2. An element 126 fixedly mounted at 127 on the frame 15 has a surface 128 to engage the leading edge of the partially formed article and a surface 129 to engage the side 47 of the partially formed article. An adjustable locating element 130, having a tapered sliding connection 131 with a stationary support 132 is adjustable relative to the support by a threaded element 134 to vary the position of a locating surface 135 relative to the surface 129 to engage the formed lip 48 of the partially formed article to locate the partially formed article on the second die 39. The guide 126 has a cut-away portion 138 to receive a spring actuated clamp 139 which is normally held out of the path of the partially formed articles by a roller 140 thereof riding on the straight side edge 141 of the side 102 until the partially formed article is located on the second die, at which time a cam-like portion 142 of the side 102 guides the roller 140 inwardly and permits the member 139 to be forced inwardly by its spring 143 to force the partially formed article against the surface 135.

The right end portion is a receptacle 145 in the form of a chute, fixed at 146 to the frame 15 and extending diagonally downwardly to direct the completed article from the tool when ejected from the second punch 54. An ejecting element 147 in the form of a rigid finger mounted at 148 on the side 101 of the transfer unit extends inwardly to position its inner end 149 closely adjacent but not in engagement with the adjacent side of the second punch 54. This position is quite accurate in that the ejecting element must engage the left end of the finished article on the second punch and move the article off the punch during opening of the tool or during the second half of the cycle.

A switch 150, in a circuit 151 of a motor 152 for the press, is normally closed and has a roller 153 on an arm of the switch positioned to be actuated by any blank which is out of correct position when moved onto the second die 39. This control means is used in conjunction with conventional control means for the ram 62 of the press. If the press is operable continuously through repeated cycles and is driven by a motor, then the motor 152 represents the motor for the press. If the press has a clutch operated by a solenoid or any other type of electrical unit at the beginning of each cycle, the motor 152 in FIG. 8 represents that solenoid or electrical unit.

*Operation*

When the tool is initially set up in the press, it will take three operating cycles for the tool to begin its first complete operation to produce an article during each cycle. During the first cycle, a blank will be moved by the fingers 107 of the transfer unit from the hopper onto the first die 29, during the second cycle there will be a simultaneous transfer of a blank from the hopper 17 onto the first die 29, and a transfer of the partially formed article by the element 122 of the unit from the first die to the second die 39. After this next cycle, the tool will automatically perform three transfer operations and two forming operations to finish a shell and transfer it during each cycle to the chute 145. When the ram 62, with the tool holder 60, the punches 51 and 54 and the cam 78 move downwardly, the transfer unit, which has previously completed its transfer operations during the preceding open or upward movement of the ram, will move to the left as shown in broken lines in FIG. 2. After this movement, the feeding fingers 107 will be free of the first die and ready to receive the next blank. Also, the feeding element 122 has been moved beyond or to the left of the first die 29 ready to receive the next article partially formed in the first die. Also the ejecting element 149 has been moved to the left of the second die 39 and is in position to eject the completed article from the second punch 54 as the punches and cam move upwardly during the second half of the operating cycle. During the second half of the operating cycle, the cam 78 controls action of the transfer unit by the spring 87 forcing the rack 93 to move to the right to rotate the pinion 97 with the shaft 98 to rotate the gears 100 and move the transfer unit to the right a distance sufficient to perform the feeding and ejecting operations.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A tool for use in a press, having a ram reciprocable through operating cycles relative to a bed, for forming multisided shells of successive blanks of material, the tool comprising first punch and die carried at aligned positions by the ram and bed respectively and cooperating to form first bends in successive blanks during successive cycles to project first side portions of each blank vertically from a given horizontal plane, second punch and die carried at aligned positions by the ram and bed at positions spaced from the first punch and die and cooperating to form additional bends in the successive blanks to project second side portions of each blank vertically and simultaneously move the first side portions into horizontal positions parallel with the plane to complete multisided shells of blanks during successive cycles, stationary first stops mounted on the bed in said plane adjacent the first die to be engaged by the first portions of the successive blanks to locate the blanks successively over the first die, a second stop mounted on the bed in said plane adjacent the second die to be engaged by one of the second portions of the blanks to locate the successive blanks over the second die, a unit responsive to the reciprocal movements of the ram during each cycle thereof, a first projection of the unit actuated to transfer a blank from the hopper in said plane over the first die and into engagement with the first stops, a second projection of the unit actuated simultaneously with the first projection to transfer blanks with the first bends successively from the first die over the second die and into engagement with the second stop in said plane, and a third projection of the unit actuated simultaneously with the first and second projections of the unit to transfer the finished shell from the second punch to the receptacle.

2. A tool according to claim 1 in which a locating element is mounted on the bed for variations in position relative to the second die to engage one of the first side portions when on the second die, and a clamp under the control of the unit to force each blank laterally in said plane into engagement with the locating element to locate the successive blanks over the second die.

References Cited in the file of this patent

UNITED STATES PATENTS

| | | |
|---|---|---|
| 793,564 | Buzek | June 27, 1905 |
| 947,360 | Wallenthin et al. | Jan. 25, 1910 |
| 977,118 | Minshull | Nov. 29, 1910 |
| 1,336,622 | Gail | Apr. 13, 1920 |
| 1,431,749 | Newman | Oct. 10, 1922 |
| 1,661,108 | Coates | Feb. 28, 1928 |
| 1,672,861 | Smith | June 5, 1928 |
| 1,849,054 | Boissou | Mar. 15, 1932 |
| 2,065,820 | Mellon | Dec. 29, 1936 |
| 2,076,236 | Holloway | Apr. 6, 1937 |
| 2,142,235 | Burns | Jan. 3, 1939 |
| 2,221,598 | McLaughlin | Nov. 12, 1940 |
| 2,306,224 | Parker et al. | Dec. 22, 1942 |

OTHER REFERENCES

Mills, W. C.: "Forming Thin-Metal Cylinders," American Machinist, Dec. 4, 1947, pages 96–103.